United States Patent
Eubank et al.

(10) Patent No.: US 11,518,854 B2
(45) Date of Patent: Dec. 6, 2022

(54) EPOXY-FUNCTIONALIZED POLYORGANOSILOXANE TOUGHENER

(71) Applicant: Ele' Corporation, McCook, IL (US)

(72) Inventors: Michele D. Eubank, Western Springs, IL (US); Yogi Patel, Bartlett, IL (US); Alexander Basil Papadakis, McCook, IL (US); Michael J. Berlin, Elkins Park, PA (US); Jia Liu, Lake Villa, IL (US)

(73) Assignee: Ele' Corporation, McCook, IL (US)

( * ) Notice: Subject to any disclaimer, the term of this patent is extended or adjusted under 35 U.S.C. 154(b) by 176 days.

(21) Appl. No.: 16/816,976

(22) Filed: Mar. 12, 2020

(65) Prior Publication Data

US 2020/0291188 A1 Sep. 17, 2020

Related U.S. Application Data

(60) Provisional application No. 62/817,995, filed on Mar. 13, 2019.

(51) Int. Cl.
*C08G 77/38* (2006.01)
*C08L 63/04* (2006.01)

(52) U.S. Cl.
CPC .............. *C08G 77/38* (2013.01); *C08L 63/04* (2013.01)

(58) Field of Classification Search
CPC .............................. C08G 77/38; C08L 63/04
USPC ........................................................ 525/407
See application file for complete search history.

(56) References Cited

U.S. PATENT DOCUMENTS

| | | | | |
|---|---|---|---|---|
| 4,480,009 A | * | 10/1984 | Berger | .................. C07F 7/0889 427/387 |
| 4,954,580 A | * | 9/1990 | Zahir | .................. C08G 59/306 525/476 |
| 2008/0261473 A1 | | 10/2008 | Will et al. | |
| 2009/0261298 A1 | | 10/2009 | Kondo et al. | |
| 2012/0196075 A1 | | 8/2012 | Takahashi et al. | |

FOREIGN PATENT DOCUMENTS

EP 1975193 A1 * 10/2008 ............. C08G 77/26
JP 2008-201904 A 9/2008

OTHER PUBLICATIONS

Will et al., EP 1975193 A1 machine translation in English, Oct. 1, 2008. (Year: 2008).*
Ma et al., "Simultaneously Increasing Impact Resistance and Thermal Properties of Epoxy Resins Modified by Polyether-Grafted-Epoxide Polysiloxane", Polymer-Plastics Technology and Engineering, Apr. 13, 2010, vol. 49, issue 5, p. 467-473 (Year: 2010).*
International Search Report and Written Opinion for PCT/US2020/022351 dated May 6, 2020.

* cited by examiner

*Primary Examiner* — David T Karst
(74) *Attorney, Agent, or Firm* — Clark Hill PLC

(57) ABSTRACT

An epoxy-functionalized polyorganosiloxane toughener providing toughening properties for thermosetting resins is described. The epoxy-functionalized polyorganosiloxane toughener is an epoxy-functionalized siloxane polyether with a siloxane backbone, at least one epoxy-containing alkyl chain, and at least one alkoxyl polyether chain, each said at least one epoxy-containing alkyl chain and at least one alkoxyl polyether chain grafted to the siloxane backbone. Also disclosed is a thermosetting resin-based composition comprising the epoxy-functionalized polyorganosiloxane toughener of claim 1 and at least one of an epoxy resin, a hardener, and an accelerator.

12 Claims, No Drawings

EPOXY-FUNCTIONALIZED POLYORGANOSILOXANE TOUGHENER

PRIORITY

This application claims priority from U.S. Provisional Application No. 62/817,995, filed on Mar. 13, 2019, the disclosure of which is incorporated herein by reference.

FIELD OF THE INVENTION

The present invention relates to an epoxy-functionalized polyorganosiloxane to increase the toughness, processability, and water resistance of toughened thermosetting resins. The toughened thermosetting resins find uses for heat-curable fiber-reinforced composites, structural adhesives, and protective coatings.

BACKGROUND OF THE INVENTION

As is known in the art, crosslinked thermosetting resins have high strength, hardness, chemical resistance, and thermal stability. The cured thermosetting resins are widely used in numerous industrial applications in composites, adhesives, protective and marine coatings. Although the compositions containing thermosetting resins exhibit excellent mechanical properties, they often exhibit inherent brittleness and require toughening agents to increase toughness.

It is known to use tougheners, or toughening agents, to improve the flexibility and toughness of thermosetting resin systems. Common tougheners are liquid rubbers, engineering thermoplastics, or core-shell rubber particles. 223505235

Most reactive liquid rubber tougheners are butadiene polymers and butadiene and acrylonitrile copolymers. Those liquid-rubber polymers (LRP) are often further modified with various of functional groups for various thermosetting resins and applications. Common ones are carboxyl, vinyl, hydroxy, amine, and epoxy terminated LRPs. The viscosity of LRP tougheners is usually rather high, in the range of 100,000 to 500,000 centipose (cps). The high viscosity limits the use of LRP tougheners in certain applications.

United States Published Patent Application No. 2018/0258261 A1 describes epoxy-terminated polybutadiene and polybutadiene acrylonitrile copolymer tougheners used in epoxy systems for adhesive applications. Although the viscosity of the described epoxy terminated polybutadienes is lower than that of the similar LRPs with other functional groups, the viscosity of LRP tougheners is still higher over, about 5000 cps at 20° C. and 35° C. In addition, the LRP tougheners are also susceptible to color stability and thermal degradation.

U.S. Pat. No. 7,847,026 B2 described an adduct form of one or more epoxy resins with carboxyl polybutadiene and polybutadiene acrylonitrile. The miscibility with epoxy resin is improved. However, the viscosity is still high. Commercially available LRPs are available from CVC Thermoset Specialties, Moorestown, N.J., US, under Hypro brand names.

Another form of rubber toughener is core-shell rubber (CSR) particle. The preferred core-shell rubber particle tougheners are available from Kanaka Corporation under names of Kaneka Kane Ace and Kaneka Kane Ace MX, and from The Dow Chemical Company under the brand name Fortegra. CSR tougheners are used as dispersed rubber particles in thermosetting resins to improve toughness properties. For epoxy-containing CSR tougheners, the epoxy groups are normally polymerized onto the polymer in the shell. Although CSR tougheners have the advantages of consistent morphology and better transparency, the required use level is normally high, over 20 weight percent.

United States Published Patent Application No. 2018/0163104 A1 describes a blocked polyurethane tougheners for epoxy adhesives. The end-capping group contains epoxy functionality. The blocked polyurethane toughener reacts with epoxy resins in adhesive compounds. Furthermore, the mentioned toughener is not isocyanate-free.

Several epoxy-functionalized tougheners have been disclosed and used in toughening thermosetting resins. However, an epoxy-functionalized toughener offering the combination of enhanced mechanical properties, improved processability, and low-temperature performance to thermosetting resins has not been made.

SUMMARY OF THE INVENTION

The present application discloses a modified polyorganosiloxane toughener providing toughening properties for thermosetting resins. The thermosetting resins containing embodiments of the invented toughener show much improved toughness, processability, and water absorption resistance. The toughener described in the present application offers enhanced toughness and mechanical properties of the toughened epoxy resins. Furthermore, it was surprisingly discovered that the epoxy-functional polyorganosiloxane toughener had an excellent processability.

DETAILED DESCRIPTION OF THE PREFERRED EMBODIMENTS OF THE INVENTION

In accordance with the present invention, the epoxy-functionalized polyorganosiloxane toughener is an epoxy-functionalized siloxane polyether, wherein the toughener comprises the following structure:

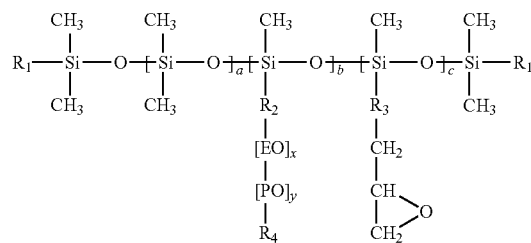

wherein a, b, c, x, and y may be independent integers; a, b, and c are equal to or greater than 1; x and y may be equal to or greater than 0, and the sum of x+y may be greater than or equal to 1. EO is ethylene oxide, PO is propylene oxide; $R_1$ may be the end group preferably chosen from hydrogen, an alkyl group, an alkenyl group, an aryl group, and a substituted hydrocarbon; $R_2$ and $R_3$ may be independent groups from: —$(CH_2)_z$—O— or —$CH_2$—$CH_2$—$C(O_2)$—, wherein z is from 2 to 5; and $R_4$ is H, $CH_3$, acetate, or epoxy.

The polyethers and epoxy-terminated hydrocarbon chains are linked to a siloxane backbone as side chains. The inventive toughener has a rack structure with pendant side chains, different from linear and cyclic polyorganosiloxanes or linear block copolymers containing siloxane segments.

The said toughener has a molecular weight of 500-100000 g/mol, preferably from 1000 to 50000, more preferably from 2000 to 20000. In addition, the viscosity of said epoxy-functionalized polyorganosiloxane toughener is from 10 cps to 10,000 cps at 25° C., preferably 50 cps to 5000 cps, or more preferably 100 cps to 2000 cps.

The silicone content in wt. % is defined as the wt. % of siloxane backbone in the toughener molecule. The ethylene oxide (EO) content in wt. % is defined as the wt. % of total EO units in the toughener molecule. The propylene oxide (PO) content in wt. % is defined as the wt. % of total PO units in the toughener molecule.

The values of a, b, c, x, y may be individually selected such that at least one side chain containing epoxy functional group is presented in the described pendant structure; silicone content is preferably from 1 to 95 wt. %, or more preferably from 5 to 95 wt. %, or even more preferably from 20 to 60 wt. %, whereas EO and PO contents vary accordingly to make up to 100 wt. % with other components.

The present toughener may be used in a thermosetting resin-based composition. The toughened thermosetting resin composition may comprise at least one toughener as described in the invention. The present toughener may be used in a toughened thermosetting resin composition from in a weight percentage preferably from 1 to 50 wt. %, or more preferably from 2 to 30 wt. %, or even more preferably 3 to 20 wt. %.

The thermosetting resins may be selected from epoxy resins. Commercially available epoxy resins contain aliphatic, cycloaliphatic or aromatic backbones. Epoxy resins may be in a liquid form or a solid form depending on resin molecular weight. Common epoxy resins include diglycidyl ether of bisphenol A (DGEBA), diglycidyl ether of bisphenol F (DGEBF), phenol or cresol Novolac epoxy resins. The high functionality of these novolac resins generally results in a high degree of crosslinking density and improves thermal stability and chemical resistance. However, due to the crosslinking density, novolac epoxy resins often need tougheners to improve fracture and impact resistances. DGEBA epoxy resin is available under the trade name EPON™ 826 from Hexion or Epotec™ YD128 from Aditya Birla. Epotec Epoxy Resin YDPN 631 is a phenol Novolac resin from Aditya Birla.

The thermosetting resins may be further selected from polyester resins, vinylic resins, acrylic resins, and isocyanate resins.

The toughened epoxy resin composition may comprise at least one hardener. Suitable hardeners in epoxy resin compositions may be chosen from, but are not limited to amines, amides, dicyandiamide (DICY), polyanhydrides, polyhydric phenols, and mercaptans. Triethylenetetramine (TETA) and piperidine are among the amine hardeners.

In certain embodiments, wherein the thermosetting resin containing epoxy groups, TETA is selected for room temperature curing, while for high temperature curing, either DICY or TETA may be used.

An accelerator may be used in epoxy resin composition with different hardeners and the toughener. Available accelerators are hindered amines, amino phenols including 2,4,6-tris (dimethylaminomethyl)phenol (DMP-30), imidazoles, ureas.

Optionally, solvent and additional additives, such as fillers, colorants, defoamers, dispersants, fibrous reinforcements can be further added to a toughened epoxy resin.

The present epoxy-functionalized polyorganosiloxane tougheners were made through the hydrosilylation reaction process of polysiloxanes with allyl-terminated polyethers and any epoxy-containing allyl compounds. The polysiloxanes used in hydrosilylation contained reactive Si—H sites in the backbone. Conventional hydrosilylation catalysts, such as chloroplatinic acid and Karstedt's catalyst, were applied in the reaction. The allyl-terminated polyethers were made from alkoxylation of allyl alcohol. Different combinations of EO and PO units may be chosen to optimize the performance of the present tougheners. Furthermore, the end group of polyether may be selected from H, OCH$_3$, acetate, and epoxy.

One method to evaluate toughness performance of toughened epoxy resins is to measure fracture toughness, $K_{1c}$ (MPa/m$^{1/2}$). In an embodiment of the present invention, epoxy resin or the epoxy resin containing the present toughener in the range from 1 to 50 wt. % was mixed with optional additives and heated to above 50° C. under vacuum for one hour followed by the addition of a hardener or a mixture of hardeners and accelerators. The epoxy mixture was then poured into molds held at curing temperature. The completely-cured epoxy resin block was then shaped into the specimen with a crack tip for fracture toughness measurement. Fracture toughness values of epoxy specimen were measured and calculated following ASTM standards D5045 method.

The adhesion and interlaminar properties of epoxy thermosetting resins with the present toughener were evaluated using Double Cantilever Beam (DCB) test method. The DCB specimens were made from aluminum bars. Beams were separated using spacers and kept in place using PTFE and Polyimide tape and silicone mold. The DCB beams and mold were preheated at a temperature above 100° C. prior to the addition of the toughened epoxies. The adhesives were prepared by mixing epoxy resin and toughener under vacuum above 50° C. for one hour, followed by the addition of a hardener or a mixture of hardener and accelerator. The epoxy mixture was then placed in a syringe and pushed through one of two small circular openings on the top beam surface until epoxy was seen purging out of the second hole. The beams were then cured at curing temperatures. DCB specimens were separated following ASTM D3433-99 method to measure and calculate strain energy release rates ($G_{1c}$, J/M$^2$).

Impact performance of toughened epoxy resins with the inventive tougheners were examined by using impact test method based on ASTM D2794 or DIN55669. Epoxy resins were mixed with tougheners in the weight percentage of 1-50 wt. %, followed by the addition of a hardener or a mixture of hardeners and accelerators. The epoxy mixtures were then coated onto a metal panel. The coated panels were dried and cured at 60° C. for one hour. The impact resistance of the prepared panels was measured using a tubular impact tester. Both normal impact and reserve impact tests were performed for the coated panels for impact resistance performance.

Various epoxy-functionalized polyorganosiloxane tougheners were made in the procedures as shown in the following examples.

Example 1: Synthesis of Polysiloxanes

Into a reaction vessel were introduced 70-140 grams of octamethylcyclotetrasiloxane, 25-50 grams of methyl hydrogen fluid, and 10 grams of hexamethyldisiloxane. Next, 0.1 to 0.5 gram of trifluoromethane sulfonic acid was added to the mixture. The mixture was purged with nitrogen gas followed by heating up to 80° C. After 20 hours of heating, the mixture was cooled down and filtered with magnesium silicate. The resulting polysiloxanes were clear and had viscosities in the range of 10-10000 cps.

Example 2: Synthesis of Allyl Alkoxylates

Into a stainless-steel reactor 10 to 50 grams of allyl alcohol and 0.05-0.1 gram of potassium hydroxide were added. The reactor was heated to 120° C. Next, 50-120 grams of ethylene oxide were charged into the reactor. The reaction was held at 120° C. for one hour. The resulting products were allyl polyethers with various EO and PO numbers.

Examples 3-9: Synthesis of Epoxy-Functionalized Polyorganosiloxane Tougheners

First, 30 to 70 grams of the polysiloxanes synthesized in Example 1 were added to a reaction vessel. Next, 3 to 10 grams of allyl glycidyl ethers, 60-100 grams of second allyl polyethers, and 0.01-0.1 gram of chloroplatinic acid were added. The mixtures were purged with nitrogen gas, heated to 120° C., and then held at temperature for one hour. After two to four hours of heating at 120° C., epoxy functionalized polyorganosiloxanes were obtained. The obtained tougheners have a viscosity from 40 to 2300 cps.

TABLE 1

The Epoxy-Functionalized Polyorganosiloxanes Obtained from Examples 1 to 3

| Tougheners | | a | b | c | x | y | Mn | Viscosity (cps, 25° C.) |
|---|---|---|---|---|---|---|---|---|
| Example 3 | PEL-Sil 1478 | 19 | 5 | 2 | 11 | 0 | 5030 | 360 |
| Example 4 | PEL-SIL 182 | 50 | 5 | 2 | 11 | 0 | 7900 | 1170 |
| Example 5 | AGE SPE 1 | 19 | 5 | 2 | 14 | 5 | 8500 | 670 |
| Example 6 | AGE SPE 2 | 50 | 5 | 2 | 14 | 5 | 10550 | 2210 |
| Example 7 | AGE SPE 3 | 10 | 2 | 1.5 | 9 | 2.5 | 2500 | 179 |
| Example 8 | AGE SPE6 | 7 | 1.5 | 1.5 | 0 | 3 | 1390 | 40 |
| Example 9 | AGE SPE7 | 7 | 1.5 | 1.5 | 0 | 10 | 1990 | 112 |

Examples 10-12

Epotec YD128 DEGBA epoxy resins were mixed with 10 wt. % epoxy-functionalized tougheners in examples 3-4, respectively. The mixtures were cured with 5 PHR piperidine at 160° C. for 6 hours. Fracture toughness values were calculated following ASTM D5045 standards with a crosshead speed of 1 mm/min. Specimens were chosen for analysis with a crack length between 45 and 55 percent of the sample height.

TABLE 2

| Formulation | Example 10 | Example 11 | Example 12 |
|---|---|---|---|
| Toughener | | Example 3 | Example 4 |
| Epoxy Resin-Epon 826 | 10 | 10 | 10 |
| Hardener-Piperidine | 1.25 | 1.25 | 1.25 |
| Toughener | 0 | 1 | 1 |
| Ethyl Acetate | 2 | 2 | 2 |
| $K_{1c}$, Mpa/m$^{1/2}$ | 0.5 | 1.34 | 1.26 |
| DCB-$G_{1c}$, J/M$^2$ | 215 | 410 | 361 |
| Appearance, Before Cure | Clear | Clear | Clear |
| Appearance, After Cure | Hazy | Opaque | Opaque |

Example 10 is the epoxy formulation without the inventive toughener as a comparative sample. The fracture toughness, $K_{1c}$, of Example 10, is at around 0.5 MPa/m$^{1/2}$, while it is clearly showed that $K_{1c}$ of Examples 11 and 12 increases to 1.34 and 1.26 MPa/m$^{1/2}$, respectively. Examples 11 and 12 were clear before curing, indicating the tougheners were compatible with the Epotec YD128 epoxy resin. The cured epoxy composition containing the present tougheners displayed opaque appearance. It was theorized, but not limited to, that the opaque appearance is due to the phase separation upon curing and the formation of dispersed toughener-rich microphases within epoxy matrix. Furthermore, it was surprisingly discovered that the epoxy compositions containing the present tougheners exhibited better flowing capability before curing.

Examples 13-26

Formulations in Examples 13-24 were prepared according to the general procedure of impact testing panels. Examples 13 to 18 are DEGBA bisphenol A epoxy resin compositions. Examples 19 to 24 are phenol Novolac epoxy resin compositions. First, 10 wt. % of epoxy-functionalized polyorganosiloxane tougheners described in Examples 3-9 was added in the formulations, respectively. The impact performance of the formulations is shown in Tables 3 and 4.

TABLE 3

| Formulation | Example 13 | Example 14 | Example 15 | Example 16 | Example 17 | Example 18 | Example 19 |
|---|---|---|---|---|---|---|---|
| Epoxy Resin-Epotec YD128 | 10 | 10 | 10 | 10 | 10 | 10 | 10 |
| Hardener-TETA | 1.25 | 1.25 | 1.25 | 1.25 | 1.25 | 1.25 | 1.25 |
| Ethyl Acetate | 2 | 2 | 2 | 2 | 2 | 2 | 2 |
| Example 3 | | 1 | | | | | |
| Example 5 | | | 1 | | | | |
| Example 6 | | | | 1 | | | |
| Example 7 | | | | | 1 | | |
| Example 8 | | | | | | 1 | |
| Example 9 | | | | | | | 1 |
| Appearance, before cure | Clear | Clear | Clear | Clear | Slightly Hazy | Opaque | Opaque |
| Appearance, after cure | Hazy | Opaque | Hazy | Opaque | Hazy | Hazy | Hazy |
| Coating Leveling | Poor | Better | Better | Better | Better | Poor | Poor |
| Impact Rating, 5 mm | 3 | 2.5 | 2 | 2 | 2.5 | 2 | 2 |
| Crosshatch Adhesion | 1 | 1 | 1 | 1 | 1 | 1 | 1 |

TABLE 4

| Formulation | Example 20 | Example 21 | Example 22 | Example 23 | Example 24 | Example 25 | Example 26 |
|---|---|---|---|---|---|---|---|
| Novolac Epoxy YDPN 631 | 10 | 10 | 10 | 10 | 10 | 10 | 10 |
| Hardener-TETA | 1.25 | 1.25 | 1.25 | 1.25 | 1.25 | 1.25 | 1.25 |
| Ethyl Acetate | 2 | 2 | 2 | 2 | 2 | 2 | 2 |
| Example 3 | | 1 | | | | | |
| Example 5 | | | 1 | | | | |
| Example 6 | | | | 1 | | | |
| Example 7 | | | | | 1 | | |
| Example 8 | | | | | | 1 | |
| Example 9 | | | | | | | 1 |
| Appearance, Before Cure | | Clear | Clear | Clear | Opaque | Hazy | Opaque |
| Appearance, After Cure | Opaque | Opaque | Opaque | Opaque | Opaque | Opaque | Opaque |
| Coating Leveling | poor | Better | Slightly Better | Slightly Better | Better | Poor | Better |
| Impact Rating, 5 mm | 3.5 | 2 | 3 | 2 | 3 | 3 | 2 |
| Crosshatch Adhesion | 1 | 1 | 1 | 1 | 1 | 1 | 1 |

Examples 14 to 19 are the formulations with DEGBA epoxy resins and epoxy functionalized polyorganosiloxane tougheners, whereas Examples 21-26 are toughened Novolac epoxy-based, compared to Examples 13 and 20 containing no tougheners as controls. It was found the impact resistance of cured toughed epoxy was improved for all examples (rating 1 is the best, rating 5 is the worst). It was also found that the opaqueness of epoxy coatings varied with different epoxy-functionalized polyorganosiloxane tougheners. It was hypothesized that the reactive epoxy functional group on the toughener reacted into epoxy resin system and therefore changed the dynamics of compatibility and phase separation. It was further observed that the adhesion of toughened epoxy coating to metal substrates remained good. Moreover, an additional benefit of adding the present toughener in epoxy resin coating was the improved leveling of the coatings for some formulations.

While preferred embodiments of the present invention are shown and described, it is envisioned that those skilled in the art may devise various modifications of the present invention without departing from the spirit and scope of the appended claims.

The invention claimed is:

1. An epoxy-functionalized polyorganosiloxane toughener, said epoxy-functionalized polyorganosiloxane toughener comprising a siloxane backbone, at least one epoxy-containing alkyl chain, and at least one alkoxyl polyether chain, each said at least one epoxy-containing alkyl chain and at least one alkoxyl polyether chain grafted to the siloxane backbone, wherein the epoxy-functionalized polyorganosiloxane toughener comprises the following structure:

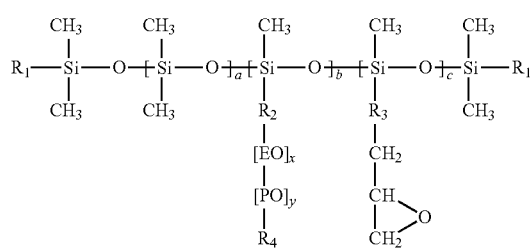

wherein a, b, c, x, and y are independent integers; a, b, and c are equal to or greater than 1; x and y are equal to or greater than 0, and the sum of x+y is greater than or equal to 1;
wherein EO is ethylene oxide and PO is propylene oxide;
wherein $R_1$ is an alkyl group; and
wherein $R_2$ and $R_3$ are independent groups chosen from the group consisting of —$(CH_2)_z$—O— or —$CH_2$—$CH_2$—$C(O_2)$—, wherein z is from 2 to 5 and $R_4$ is $CH_3$, acetate, or epoxy.

2. A thermosetting resin-based composition comprising the epoxy-functionalized polyorganosiloxane toughener of claim 1, a hardener, and an epoxy resin.

3. An epoxy-functionalized polyorganosiloxane toughener, said epoxy-functionalized polyorganosiloxane toughener comprising a siloxane backbone, at least one epoxy-containing alkyl chain, and at least one alkoxyl polyether chain, each said at least one epoxy-containing alkyl chain and at least one alkoxyl polyether chain grafted to the siloxane backbone, wherein the epoxy-functionalized polyorganosiloxane toughener comprises the following structure:

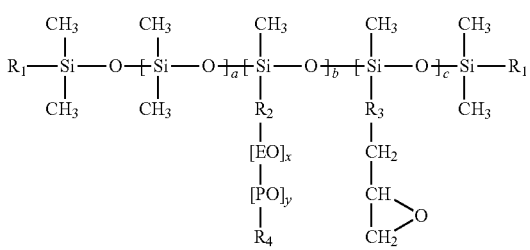

wherein a, b, c, x, and y are independent integers, a, b, and c are equal to or greater than 1, x and y are equal to or greater than 0, and the sum of x+y is greater than or equal to 1;
wherein EO is ethylene oxide;
wherein PO is propylene oxide;
wherein $R_2$ and $R_3$ are independent groups chosen from the group consisting of —$(CH_2)_z$—O— or —$CH_2$—$CH_2$—$C(O_2)$—, wherein z is from 2 to 5; and
wherein $R_4$ is H, $CH_3$, acetate, or epoxy.

4. A thermosetting resin-based composition comprising the epoxy-functionalized polyorganosiloxane toughener of claim 3, a hardener, and an epoxy resin.

5. An epoxy-functionalized polyorganosiloxane toughener, said epoxy-functionalized polyorganosiloxane toughener comprising a siloxane backbone, at least one epoxy-containing alkyl chain, and at least one alkoxyl polyether chain, each said at least one epoxy-containing alkyl chain and at least one alkoxyl polyether chain grafted to the siloxane backbone, wherein the epoxy-functionalized polyorganosiloxane toughener comprises the following structure:

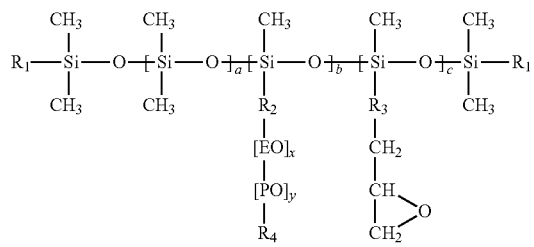

wherein a, b, c, x, and y are independent integers, a is between 1 and 40, b is between 1 and 30, c is between 1 and 20, and the sum of x+y is between 1 and 15;
wherein EO is ethylene oxide;
wherein PO is propylene oxide;
wherein $R_1$ is an alkyl group; and
wherein $R_2$ and $R_3$ are independent groups chosen from the group consisting of —$(CH_2)_z$—O— or —$CH_2$—$CH_2$—$C(O_2)$—, wherein z is from 2 to 5.

6. A thermosetting resin-based composition comprising the epoxy-functionalized polyorganosiloxane toughener of claim 5, a hardener, and an epoxy resin.

7. An epoxy-functionalized polyorganosiloxane toughener, said epoxy-functionalized polyorganosiloxane toughener comprising a siloxane backbone, at least one epoxy-containing alkyl chain, and at least one alkoxyl polyether chain, each said at least one epoxy-containing alkyl chain and at least one alkoxyl polyether chain grafted to the siloxane backbone, wherein the epoxy-functionalized polyorganosiloxane toughener comprises the following structure:

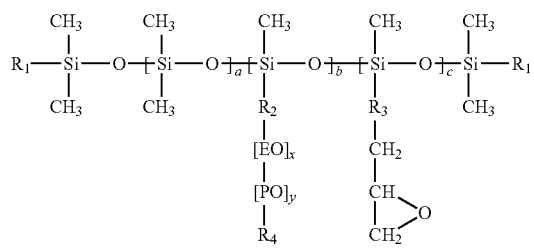

wherein a, b, c, x, and y are independent integers, a, b, and c are equal to or greater than 1, x and y are equal to or greater than 0, and the sum of x+y is greater than or equal to 1;
wherein EO is ethylene oxide;
wherein PO is propylene oxide;
wherein $R_1$ is an alkenyl group;
wherein $R_2$ and $R_3$ are independent groups chosen from the group consisting of —$(CH_2)_z$—O— or —$CH_2$—$CH_2$—$C(O_2)$—, wherein z is from 2 to 5; and
wherein $R_4$ is H, $CH_3$, acetate, or epoxy.

8. A thermosetting resin-based composition comprising the epoxy-functionalized polyorganosiloxane toughener of claim 7, a hardener, and an epoxy resin.

9. An epoxy-functionalized polyorganosiloxane toughener, said epoxy-functionalized polyorganosiloxane toughener comprising a siloxane backbone, at least one epoxy-containing alkyl chain, and at least one alkoxyl polyether chain, each said at least one epoxy-containing alkyl chain and at least one alkoxyl polyether chain grafted to the siloxane backbone, wherein the epoxy-functionalized polyorganosiloxane toughener comprises the following structure:

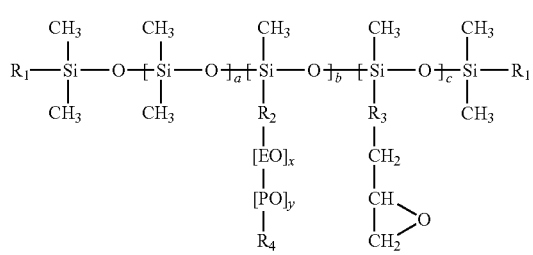

wherein a, b, c, x, and y are independent integers, a, b, and c are equal to or greater than 1, x and y are equal to or greater than 0, and the sum of x+y is greater than or equal to 1;
wherein EO is ethylene oxide;
wherein PO is propylene oxide;
wherein $R_1$ is an aryl group;
wherein $R_2$ and $R_3$ are independent groups chosen from the group consisting of —$(CH_2)_z$—O— or —$CH_2$—$CH_2$—$C(O_2)$—, wherein z is from 2 to 5; and
wherein $R_4$ is H, $CH_3$, acetate, or epoxy.

10. A thermosetting resin-based composition comprising the epoxy-functionalized polyorganosiloxane toughener of claim 9, a hardener, and an epoxy resin.

11. An epoxy-functionalized polyorganosiloxane toughener, said epoxy-functionalized polyorganosiloxane toughener comprising a siloxane backbone, at least one epoxy-containing alkyl chain, and at least one alkoxyl polyether chain, each said at least one epoxy-containing alkyl chain and at least one alkoxyl polyether chain grafted to the siloxane backbone, wherein the epoxy-functionalized polyorganosiloxane toughener comprises the following structure:

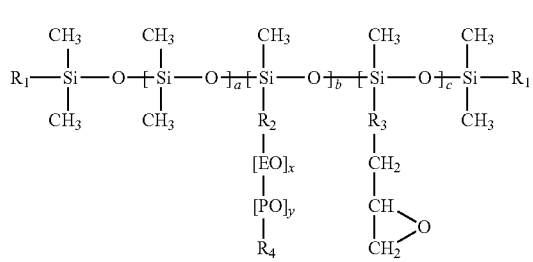

wherein a, b, c, x, and y are independent integers, a, b, and c are equal to or greater than 1, x and y are equal to or greater than 0, and the sum of x+y is greater than or equal to 1;
wherein EO is ethylene oxide;
wherein PO is propylene oxide;

wherein $R_1$ is a substituted hydrocarbon which does not include a quaternary nitrogen atom;

wherein $R_2$ and $R_3$ are independent groups chosen from the group consisting of —$(CH_2)_z$—O— or —$CH_2$—$CH_2$—$C(O_2)$—, wherein z is from 2 to 5; and wherein $R_4$ is H, $CH_3$, acetate, or epoxy.

12. A thermosetting resin-based composition comprising the epoxy-functionalized polyorganosiloxane toughener of claim 11, a hardener, and an epoxy resin.

\* \* \* \* \*